Figure 1:
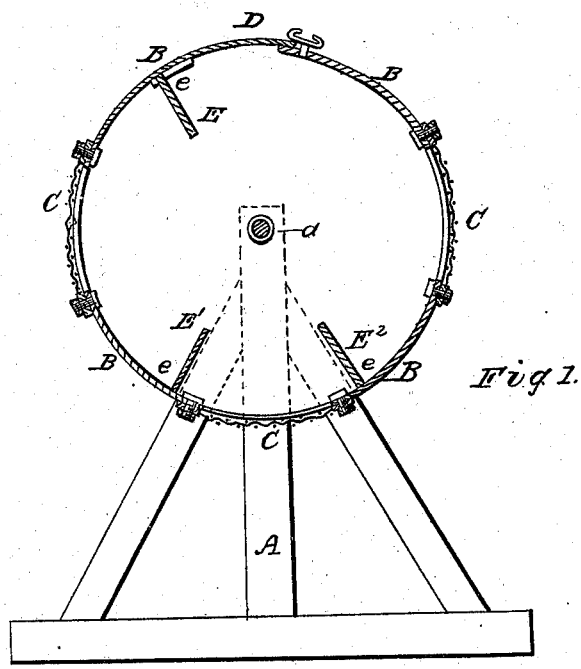

J. W. BRADY.
Coffee Cleaner.

No. 100,493.

Patented March 8, 1870.

Witnesses
Chas A. Harkness
J. S. Brown

Inventor
J. W. Brady
By E. A. Ellsworth
Attorney

United States Patent Office.

JAMES W. BRADY, OF BALTIMORE, MARYLAND, ASSIGNOR TO M. W. BRADY, OF SAME PLACE.

Letters Patent No. 100,493, dated March 8, 1870.

IMPROVED COFFEE-CLEANING MACHINE.

The Schedule referred to in these Letters Patent and making part of the same.

*To all whom it may concern:*

Be it known that I, JAMES W. BRADY, of Baltimore, in the county of Baltimore, and State of Maryland, have invented new and useful Improvements in Machinery for Cleaning Coffee; and I do hereby declare the following to be a full, clear, and exact description thereof, which will enable others skilled in the art to which my invention appertains to make and use the same, reference being had to the accompanying drawing forming part of this specification, in which—

The figure is a transverse vertical section of my improved coffee-cleaning machine.

In the accompanying drawing, the cylinder is shown mounted on an an axle, $a$, revolving in suitable bearings in a frame, A.

The cylinder is, by preference, formed of sections, B, of sheet metal, alternating with wire-gauze or perforated-metal screens C, secured to the metal sections by screws and nuts or equivalent fastenings, to allow the screens to be removed or replaced by others of varying fineness, according to the work to be done.

The coffee is supplied to or removed from the cylinder by a door, D, having suitable fastenings, to prevent its accidental opening.

Radial ribs or shelves, E $E^1$ $E^2$, are secured at their ends to the inner circumference of the cylinder, in such a manner as to leave a small opening between their outer edges and the cylinder, in order that the fine dust may pass through. Or, if desired, the shelves may be made without the spaces $c$.

The operation is as follows:

The desired quantity of coffee to be cleaned is placed in the cylinder, the door closed, and the cylinder revolved by power applied in any proper manner at the rate of, say, twenty revolutions per minute. As the cylinder revolves, the coffee is alternately rubbed over the metallic surfaces, tumbled over the shelves, and sifted by the screens, thus thoroughly cleaning it.

The shelves, it will be observed, are not arranged equidistant around the cylynder, but two of them, $E^1$ $E^2$, are arranged one on each side of one screen, while the other, E, is placed between the screens.

The coffee is thus tumbled alternately over the shelves upon the screen and upon the solid surface, which process aids the cleaning.

If desired, the shelves may be arranged obliquely within the cylinder, instead of parallel to its axis, and plates composed of wood substituted for the solid metal plates B in the cylinder.

Having thus described my invention,

What I claim as new, and desire to secure by Letters Patent, is—

The cleaning-cylinder, formed of alternate sections of imperforate metal, B, and removable wire-cloth or perforated-metal sections C, and provided with radial shelves E $E^1$ $E^2$, and spaces $e$, between the outer edges of said shelves and the inner circumference of the cylinder, all constructed, arranged, and operating as herein set forth.

J. W. BRADY.

Witnesses:
CHAS. A. HARKNESS,
EDM. F. BROWN.